(12) United States Patent
    Mitobe (10) Patent No.: US 9,578,196 B2
(45) Date of Patent: Feb. 21, 2017

(54) CONTROL DEVICE, IMAGE FORMING APPARATUS, AND CONTROL METHOD FOR PROCESSING INTERRUPTION INFORMATION

(71) Applicant: FUJI XEROX CO., LTD., Tokyo (JP)

(72) Inventor: Yasuaki Mitobe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/810,607

(22) Filed: Jul. 28, 2015

(65) Prior Publication Data
    US 2016/0286066 A1    Sep. 29, 2016

(30) Foreign Application Priority Data
    Mar. 27, 2015    (JP) .................................. 2015-067400

(51) Int. Cl.
    *H04N 1/00*    (2006.01)
    *G05B 15/02*   (2006.01)
    *H04N 1/21*    (2006.01)

(52) U.S. Cl.
    CPC .......... *H04N 1/00915* (2013.01); *G05B 15/02* (2013.01); *H04N 1/0083* (2013.01); *H04N 1/00236* (2013.01); *H04N 1/21* (2013.01)

(58) Field of Classification Search
    CPC combination set(s) only.
    See application file for complete search history.

(56) References Cited

U.S. PATENT DOCUMENTS

| | | | | |
|---|---|---|---|---|
| 4,715,012 A | * | 12/1987 | Mueller, Jr. ......... | A01B 63/112 701/50 |
| 5,218,457 A | * | 6/1993 | Burkhardt .............. | H04N 1/333 358/1.9 |
| 5,752,075 A | * | 5/1998 | Kikinis ................. | G06F 1/1632 358/501 |
| 6,754,738 B2 | * | 6/2004 | Brice, Jr. ................ | G06F 13/24 710/260 |

(Continued)

FOREIGN PATENT DOCUMENTS

JP         2014-3377 A      1/2014

*Primary Examiner* — Barbara Reinier
(74) *Attorney, Agent, or Firm* — Sughrue Mion, PLLC (57) ABSTRACT

A control device includes a second sub-controller to which second devices are connected, a first sub-controller to which first devices are connected, a master controller that controls the first and second sub-controllers, and so on. The second sub-controller includes a second interruption information memory that stores second interruption information output from the second devices, and a second interruption controller that transmits an interruption signal upon storing of the second interruption information in the second interruption information memory, and reads and transmits the second interruption information. The first sub-controller includes a first interruption information memory that stores first interruption information output from the first devices, and the second interruption information transmitted from the second sub-controller, and a first interruption controller that transmits the interruption signal received from the second sub-controller, and reads and transmits the first interruption information and the second interruption information stored in the first interruption information memory.

14 Claims, 5 Drawing Sheets

(56) References Cited

U.S. PATENT DOCUMENTS

| | | | |
|---|---|---|---|
| 7,023,574 B2* | 4/2006 | Furuichi | H04N 1/00408 358/1.14 |
| 9,013,731 B2 | 4/2015 | Yoshida et al. | |
| 2009/0216930 A1* | 8/2009 | Nishino | G06F 13/26 710/267 |
| 2010/0030920 A1* | 2/2010 | Casper | G06F 13/124 710/5 |

* cited by examiner

CONTROL DEVICE, IMAGE FORMING APPARATUS, AND CONTROL METHOD FOR PROCESSING INTERRUPTION INFORMATION

CROSS-REFERENCE TO RELATED APPLICATIONS

This application is based on and claims priority under 35 USC 119 from Japanese Patent Application No. 2015-067400 filed Mar. 27, 2015.

BACKGROUND

Technical Field

The present invention relates to a control device, an image forming apparatus, and a control method.

SUMMARY

According to an aspect of the invention, there is provided a control device including a second sub-controller, a first sub-controller, a master controller, a full-duplex serial bus, a full-duplex serial or parallel bus, and a unidirectional transmission line. To the second sub-controller, one or more second devices are connected. The second sub-controller includes a second interruption information memory that stores second interruption information output from the second devices, and a second interruption controller that transmits an interruption signal upon storing of the second interruption information in the second interruption information memory, and reads and transmits the second interruption information stored in the second interruption information memory. To the first sub-controller, one or more first devices are connected. The first sub-controller includes a first interruption information memory that stores first interruption information output from the first devices, and the second interruption information transmitted from the second sub-controller, and a first interruption controller that transmits the interruption signal received from the second sub-controller, and reads and transmits the first interruption information and the second interruption information stored in the first interruption information memory. The master controller controls the first sub-controller and the second sub-controller. The full-duplex serial bus connects the master controller and the first sub-controller to each other. The full-duplex serial or parallel bus connects the first sub-controller and the second sub-controller to each other. The unidirectional transmission line is used to transmit the interruption signal from the second sub-controller to the first sub-controller.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described with reference to the drawings.

Figure 1:
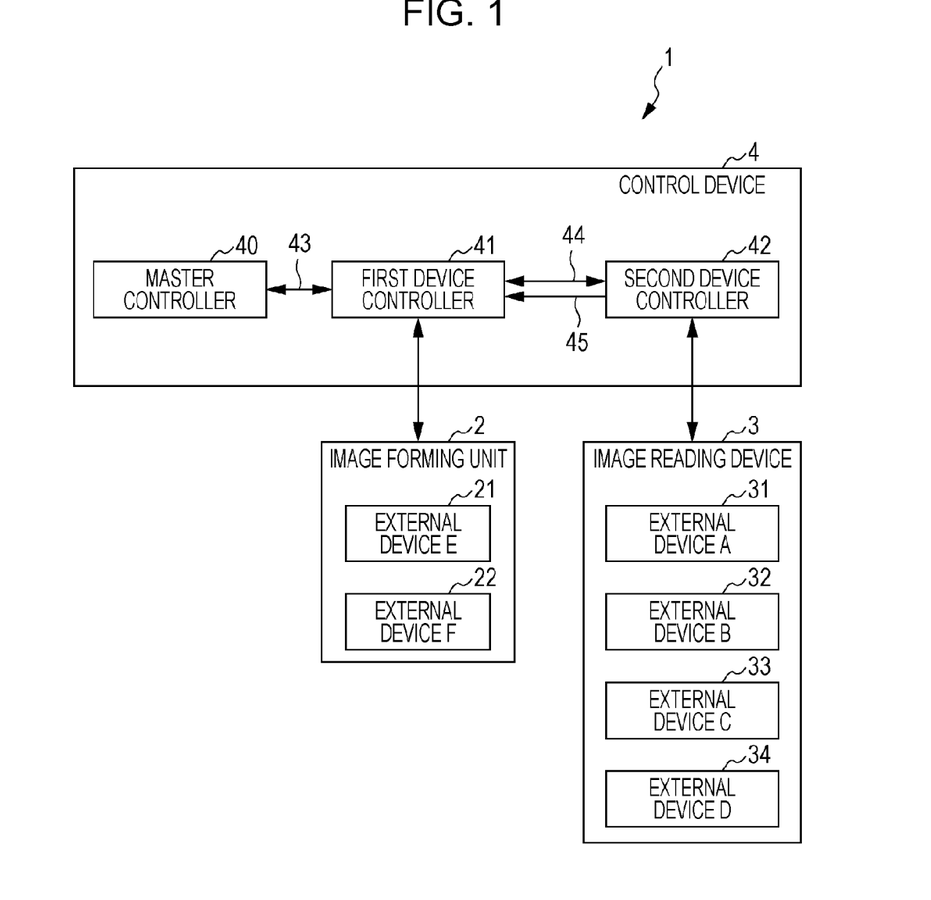
FIG. 1 is a block diagram illustrating an image forming apparatus to which a control device according to an exemplary embodiment of the present invention is applied.

FIG. 1 is a block diagram illustrating an overview of an image forming apparatus to which a control device according to an exemplary embodiment of the present invention is applied.

Overall Configuration of Image Forming Apparatus

An image forming apparatus 1 according to this exemplary embodiment is configured as a color copier, for example. As illustrated in FIG. 1, the image forming apparatus 1 includes an image reading device 3 that reads an image of a document, an image forming unit 2 that is an example of an image forming section and that forms an image on a recording medium on the basis of image data of the document, an image of which is read by the image reading device 3, or on the basis of image data transmitted from an external host apparatus, such as a personal computer, and a control device 4 that controls the image reading device 3 and the image forming unit 2.

The image forming unit 2 includes one or more first external devices (devices), such as a first external device 21 and a first external device 22 (external devices E and F in FIG. 1, hereinafter sometimes referred to as external devices 21 and 22). The first external device 21 is constituted by at least one driving motor that drives a photoconductor drum, a developing device, a sheet conveying device, a secondary transfer device, a fixing device, or the like. The first external device 22 is constituted by at least one sheet sensor that detects a recording sheet that is an example of a recording medium. The image forming unit 2 is not limited to a unit that forms an image on the basis of an electrophotographic method using a photoconductor drum or the like, and may be a unit that forms an image on the basis of another method, such as an inkjet method.

The image reading device 3 includes one or more second external devices (devices), such as a second external device 31, a second external device 32, a second external device 33, and a second external device 34 (external devices A to D in FIG. 1, hereinafter sometimes referred to as external devices 31 to 34). The second external device 31 is constituted by a driving motor that drives a document conveying mechanism formed of a feed roller and a separating roller that feed documents, plural conveying rollers that convey documents to a document read position, and an ejecting roller that ejects documents. The second external device 32 is constituted by a driving motor that drives a carriage (movable body) equipped with an image reading element and a mirror. The second external device 33 is constituted by the image reading element that reads an image of a document. The second external device 34 is constituted by a size detecting sensor that detects the size of a document in a main scanning direction and in a sub-scanning direction.

The control device 4 controls a read operation of reading an image of a document which is performed by the image reading device 3, an image forming operation of forming an image on a recording medium which is performed by the image forming unit 2, and the like.

Figure 2:
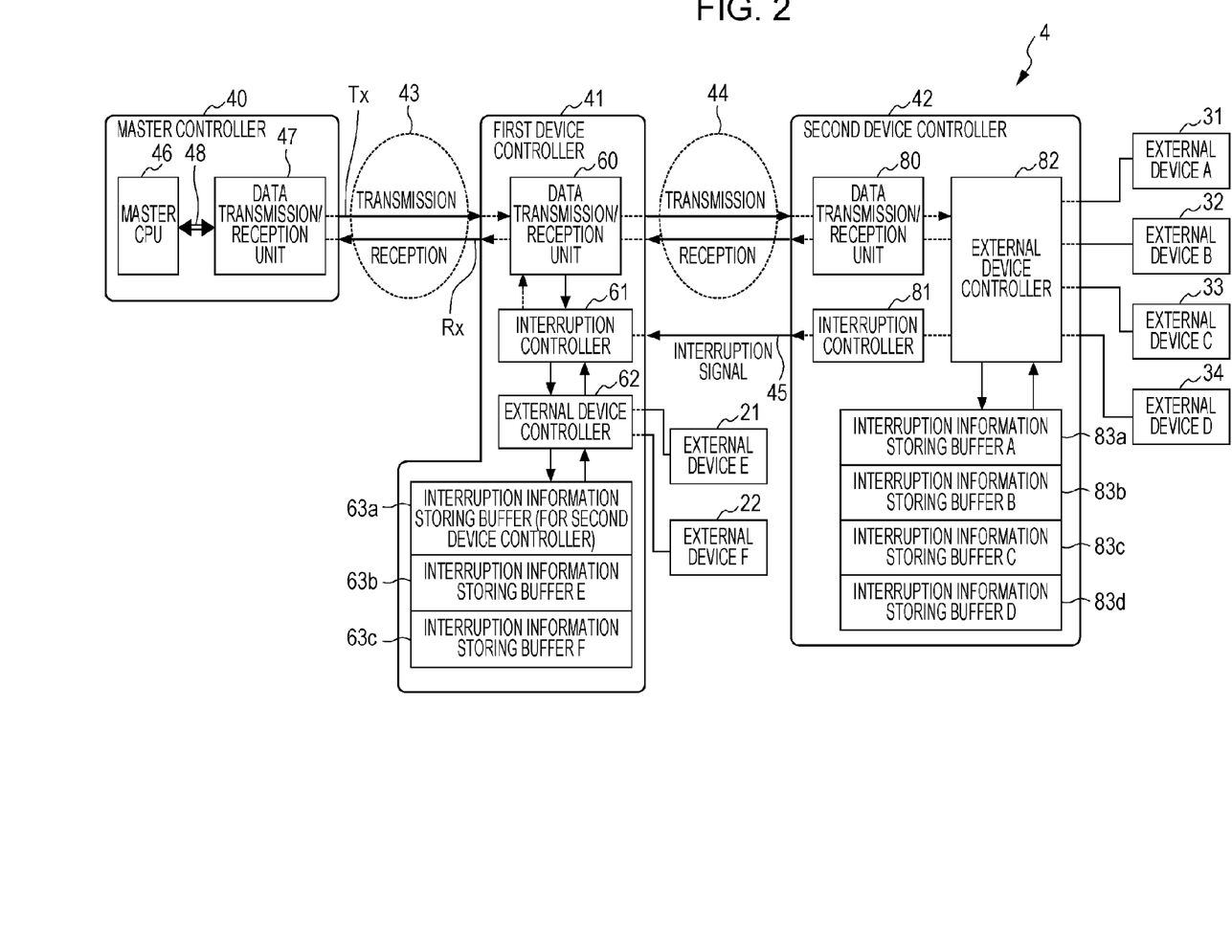
FIG. 2 is a block diagram illustrating a control device according to the exemplary embodiment of the present invention.

The control device 4 includes a first device controller 41 that controls the image forming unit 2 and that is an example of a first sub-controller, a second device controller 42 that controls the image reading device 3 and that is an example of a second sub-controller, and a master controller 40 that controls both the first device controller 41 and the second device controller 42, as illustrated in FIG. 1. The master controller 40 and the first device controller 41 are connected to each other via a full-duplex serial bus 43. As illustrated in FIG. 2, the serial bus 43 is a full-duplex transmission line that includes a signal line Tx for transmission and a signal line Rx for reception when seen from the master controller 40. The first device controller 41 and the second device controller 42 are connected to each other via a full-duplex serial bus 44 (or a parallel bus). In this exemplary embodiment, the first device controller 41 and the second device controller 42 are connected to each other via the full-duplex serial bus 44. Further, the control device 4 is provided with a signal line 45 that serves as a unidirectional transmission line for transmitting interruption information described below from the second device controller 42 to the first device controller 41. As described above, the first device controller 41 is firstly connected to the master controller 40 via the serial bus 43 (hereinafter referred to as "first connection"). On the other hand, the second device controller 42 is connected to the first device controller 41 that is firstly connected to the master controller 40, via the serial bus 44, and is secondly connected to the master controller 40 (hereinafter referred to as "second connection").

The master controller 40 includes a master central processing unit (CPU) 46, which is an example of a control section, and a data transmission/reception unit 47, as illustrated in FIG. 2. The master CPU 46 entirely controls the image forming unit 2 and the image reading device 3 in accordance with a program while referring to data stored in a random access memory (RAM) or the like not illustrated. Note that the program executed by the master CPU 46 may be a program stored in advance in a read-only memory (ROM) not illustrated, such as a hard disk drive (HDD), a flexible disc, a digital versatile disc (DVD), a magneto-optical disc, a universal serial bus (USB) memory, or the like not illustrated, or may be a program transmitted from another apparatus that is connected via a communication interface not illustrated and thereafter stored in a ROM.

The master CPU 46 is connected to the data transmission/reception unit 47 via a CPU bus 48. The CPU bus 48 is a parallel bus that includes plural signal lines.

When the data transmission/reception unit 47 receives, from the master CPU 46 via the CPU bus 48, a control signal that is formed of a parallel signal and that is to be transmitted to the first device controller 41 and the second device controller 42, the data transmission/reception unit 47 separates the control signal into packets in accordance with a predetermined rule, converts the packets into a serial signal, and transmits the serial signal to the first device controller 41 via the serial bus 43. When the data transmission/reception unit 47 receives packets in a serial format from the first device controller 41 via the serial bus 43 or from the second device controller 42 via the serial bus 43 and the serial bus 44, the data transmission/reception unit 47 converts the received packets into packets in a parallel format, decodes the packets in a parallel format, and extracts data contained in the packets.

Figure 3:
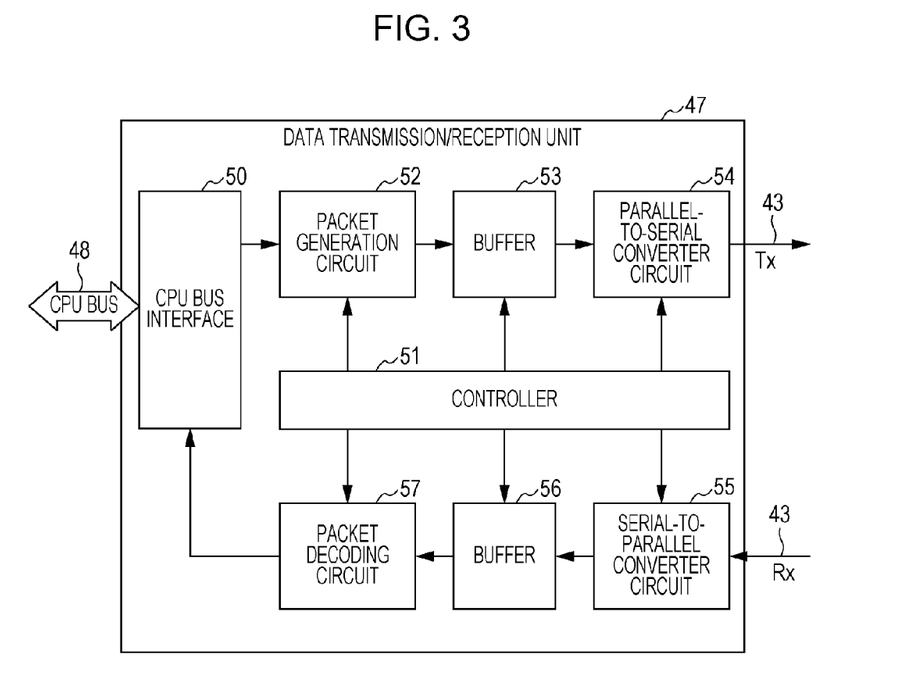
FIG. 3 is a block diagram illustrating a data transmission/reception unit of a master controller.

As illustrated in FIG. 3, the data transmission/reception unit 47 includes a CPU bus interface 50, a controller 51, a packet generation circuit 52, a buffer 53, a parallel-to-serial converter circuit 54, a serial-to-parallel converter circuit 55, a buffer 56, and a packet decoding circuit 57.

The CPU bus interface 50 is a communication interface for communicating with the master CPU 46 via the CPU bus 48 that is formed of a parallel bus. The controller 51 is connected to the CPU bus interface 50, the packet generation circuit 52, the buffer 53, the parallel-to-serial converter circuit 54, the serial-to-parallel converter circuit 55, the buffer 56, and the packet decoding circuit 57 that constitute the data transmission/reception unit 47, and entirely controls the data transmission/reception unit 47 by performing protocol control or controlling operation timings and the like of the above-described constituent components.

The packet generation circuit 52 generates packets in accordance with a predetermined rule on the basis of a control signal transmitted from the master CPU 46. The buffer 53 temporarily stores the packets generated by the packet generation circuit 52. The parallel-to-serial converter circuit 54 coverts the packets in a parallel format temporarily stored in the buffer 53 into packets in a serial format, and transmits the packets to the first device controller 41 via the serial bus 43. Here, the packets that are transmitted to the first device controller 41 include packets to be transmitted to the second device controller 42 via the first device controller 41.

On the other hand, the serial-to-parallel converter circuit 55 coverts packets in a serial format received from the first device controller 41 via the serial bus 43 into packets in a parallel format. Here, the packets received from the first device controller 41 include packets (information) transmitted from the second device controller 42. The buffer 56 temporarily stores the packets in a parallel format converted by the serial-to-parallel converter circuit 55. The packet decoding circuit 57 decodes the packets in a parallel format temporarily stored in the buffer 56, and extracts data (including interruption information) contained in the packets. Data output from the packet decoding circuit 57 is transmitted to the CPU bus interface 50.

The first device controller 41 includes a data transmission/reception unit 60, an interruption controller 61, an external device controller 62, and plural interruption information storing buffers 63*a* to 63*c* (hereinafter sometimes referred to as interruption information storing buffers 63), which are an example of a first interruption information memory, as illustrated in FIG. 2.

When the data transmission/reception unit 60 receives packets in a serial format from the master controller 40 via the serial bus 43, the data transmission/reception unit 60 converts the received packets into packets in a parallel format, decodes the packets in a parallel format, and extracts data contained in the packets. The data transmission/reception unit 60 separates information (parallel signal) to be transmitted to the master controller 40 and the second device controller 42 into packets, converts the packets into a serial signal, and transmits the serial signal to the master controller 40 via the serial bus 43 and to the second device controller 42 via the serial bus 44. Further, when the data transmission/reception unit 60 receives packets in a serial format from the second device controller 42 via the serial bus 44, the data transmission/reception unit 60 converts the received packets into packets in a parallel format, decodes the packets in a parallel format, and extracts data contained in the packets.

The interruption controller 61 receives an interruption signal input from the second device controller 42 via the signal line 45, and controls an interruption process on the basis of the interruption signal.

The interruption information storing buffers 63 constitute the first interruption information memory and temporarily store first interruption information output from the external devices 21 and 22 of the image forming unit 2 and second interruption information transmitted from the second device controller 42. The interruption information storing buffers 63 include the interruption information storing buffer 63a for the second device controller which stores the second interruption information transmitted from the second device controller 42, and the interruption information storing buffers 63b and 63c (interruption information storing buffers E and F in FIG. 2) for the first device controller which store the first interruption information output from the external devices 21 and 22 of the image forming unit 2. The number of interruption information storing buffers for the first device controller that are provided (interruption information storing buffers 63b and 63c) is equal to the number of external devices that are connected to the first device controller 41 (external devices 21 and 22) (two in the example illustrated in FIG. 2). Note that, as the first interruption information memory, a memory in which a write area and a read area are specified by addresses may be used.

The external device controller 62 is connected to each of the external devices 21 and 22 that constitute the image forming unit 2 of the image forming apparatus 1. When data for controlling a device is written to an output register of an input/output control register group not illustrated, the external device controller 62 outputs a driving signal based on the data to the device that corresponds to the output register. Then, the device is driven in accordance with the output driving signal. When a signal that indicates the state of a device that is connected to the external device controller 62 is input from the device, the external device controller 62 writes data based on the signal to an input register for the data indicating the state of the device. When a signal that indicates an interruption state is input from any of the external devices 21 and 22, the external device controller 62 writes data (interruption information) based on the signal that indicates an interruption state to a corresponding one of the interruption information storing buffers 63b and 63c. Data that indicates the state of a device may be, if the device is a sensor, data that indicates a detection result from the sensor, or may be, if the device is a motor, data that indicates the rotation state of the motor.

When the interruption controller 61 receives an interruption signal that is input from the second device controller 42 via the signal line 45, the interruption controller 61 writes data (interruption information) based on the signal indicating an interruption state of any of the external devices 31 to 34 that are connected to the second device controller 42 to the interruption information storing buffer 63a. Examples of information that indicates an interruption state include information about a jam which indicates that a sheet detection sensor does not detect, within a predetermined period, a recording sheet passing through, and information about a failure of the sensor itself. Note that information indicating an interruption state is received via the serial bus 44.

Figure 4:
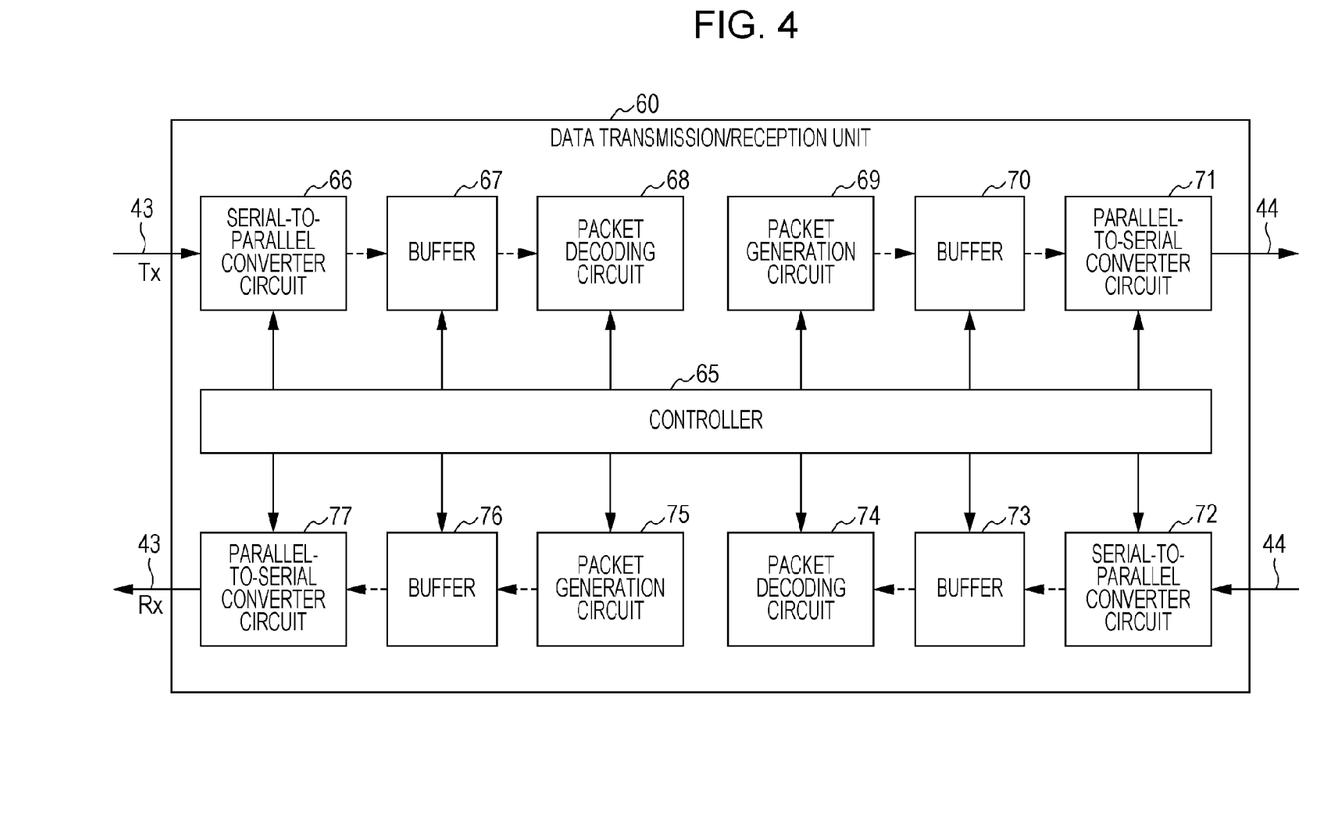
FIG. 4 is a block diagram illustrating a data transmission/reception unit of a first device controller.

The data transmission/reception unit 60 includes a controller 65, a serial-to-parallel converter circuit 66 for receiving a control signal from the master controller 40, a buffer 67, a packet decoding circuit 68, a packet generation circuit 69 for transmitting a control signal to the second device controller 42, a buffer 70, a parallel-to-serial converter circuit 71, a serial-to-parallel converter circuit 72 for receiving data from the second device controller 42, a buffer 73, a packet decoding circuit 74, a packet generation circuit 75 for transmitting data to the master controller 40, a buffer 76, and a parallel-to-serial converter circuit 77, as illustrated in FIG. 4.

The controller 65 is connected to the above-described constituent components and entirely controls the data transmission/reception unit 60 by performing protocol control or controlling operation timings and the like of the constituent components.

The serial-to-parallel converter circuit 66 converts packets in a serial format received from the master controller 40 via the serial bus 43 into packets in a parallel format. The buffer 67 temporarily stores the packets in a parallel format converted by the serial-to-parallel converter circuit 66. The packet decoding circuit 68 decodes the packets in a parallel format temporarily stored in the buffer 67, and extracts data contained in the packets.

The packet generation circuit 69 generates packets to be transmitted to the second device controller 42. The buffer 70 temporarily stores the packets generated by the packet generation circuit 69. The parallel-to-serial converter circuit 71 converts the packets in a parallel format temporarily stored in the buffer 70 into packets in a serial format, and transmits the converted packets to the second device controller 42 via the serial bus 44.

The serial-to-parallel converter circuit 72 converts packets in a serial format received from the second device controller 42 via the serial bus 43 into packets in a parallel format. The buffer 73 temporarily stores the packets in a parallel format converted by the serial-to-parallel converter circuit 72. The packet decoding circuit 74 decodes the packets in a parallel format temporarily stored in the buffer 73, and extracts data contained in the packets.

The packet generation circuit 75 generates packets to be transmitted to the master controller 40. The buffer 76 temporarily stores the packets generated by the packet generation circuit 75. The parallel-to-serial converter circuit 77 converts the packets in a parallel format temporarily stored in the buffer 76 into packets in a serial format, and transmits the converted packets to the master controller 40 via the serial bus 43.

Data that is stored in the interruption information storing buffer 63a and that indicates an occurrence of an interruption is transmitted from the second device controller 42 via the serial bus 44. The data that is transmitted from the second device controller 42 and that indicates an occurrence of an interruption is converted by the parallel-to-serial converter circuit 77 into packets in a serial format, and the packets are transmitted to the master controller 40 in a similar manner to data that is generated within the first device controller 41 and that indicates an occurrence of an interruption.

Configuration of Second Device Controller

The second device controller 42 includes a data transmission/reception unit 80, an interruption controller 81, an external device controller 82, and plural interruption information storing buffers 83a to 83d (interruption information storing buffers A to D in FIG. 2), as illustrated in FIG. 2.

When the data transmission/reception unit 80 receives packets in a serial format from the first device controller 41 via the serial bus 44, the data transmission/reception unit 80 converts the received packets into packets in a parallel format, decodes the packets in a parallel format, and extracts data contained in the packets. The data transmission/reception unit 80 separates information (parallel signal) to be transmitted to the first device controller 41 into packets, converts the packets into a serial signal, and transmits the serial signal to the first device controller 41 via the serial bus 44.

When the interruption controller 81 detects, via the external device controller 82, data that indicates an occurrence of an interruption having been written to at least one of the interruption information storing buffers 83a to 83d, the interruption controller 81 generates an interruption signal and transmits the interruption signal to the first device controller 41 via the dedicated signal line 45.

The interruption information storing buffers 83*a* to 83*d* function as a second interruption information memory and temporarily store data that indicates an interruption state of the external devices 31 to 34 and that is output from the external devices 31 to 34 of the image reading device 3. The number of interruption information storing buffers that are provided (interruption information storing buffers 83*a* to 83*d*) is equal to the number of external devices that are connected to the second device controller 42 (external devices 31 to 34).

The external device controller 82 is connected to each of the external devices 31 to 34 that constitute the image reading device 3 of the image forming apparatus 1. When data for controlling any device among the external devices 31 to 34 is written to an output register of an input/output control register group not illustrated, the external device controller 82 outputs a driving signal based on the data to the device among the external devices 31 to 34 that corresponds to the output register. Then, the device among the external devices 31 to 34 is driven in accordance with the output driving signal. When a signal that indicates the state of any device among the external devices 31 to 34 that are connected to the external device controller 82 is input from the device, the external device controller 82 writes data based on the signal to an input register for the data indicating the state of the device. Data that indicates the state of a device may be, if the device is a sensor, data that indicates a detection result from the sensor, or may be, if the device is a motor, data that indicates the rotation state of the motor.

When data indicating an occurrence of an interruption is written to any of the interruption information storing buffers 83*a* to 83*d*, the interruption controller 81 generates an interruption signal. The generated interruption signal is transmitted by the interruption controller 81 to the first device controller 41 via the signal line 45. Note that the interruption controller 81 need not generate an interruption signal in response to detection of data that indicates an occurrence of an interruption having been written to any of the interruption information storing buffers 83*a* to 83*d*. The interruption controller 81 may generate an interruption signal in accordance with a signal (write signal) for writing data indicating an occurrence of an interruption to any of the interruption information storing buffers 83*a* to 83*d* (at the same timing as the write signal).

Figure 5:
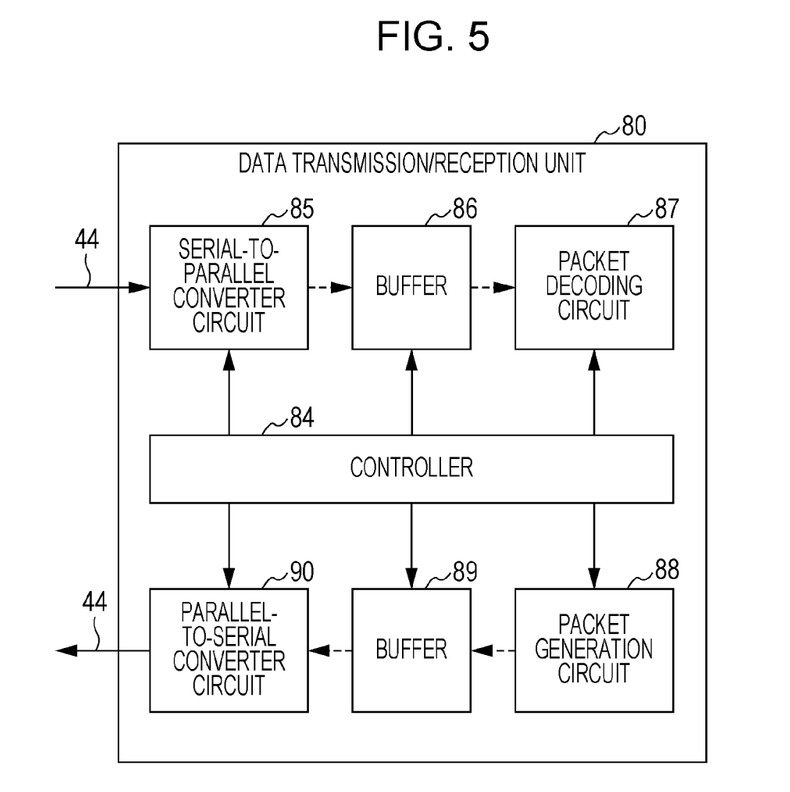
FIG. 5 is a block diagram illustrating a data transmission/reception unit of a second device controller.

The data transmission/reception unit 80 includes a controller 84, a serial-to-parallel converter circuit 85, a buffer 86, a packet decoding circuit 87, a packet generation circuit 88, a buffer 89, and a parallel-to-serial converter circuit 90, as illustrated in FIG. 5.

The controller 84 is connected to the above-described constituent components and entirely controls the data transmission/reception unit 80 by performing protocol control or controlling operation timings and the like of the constituent components.

The serial-to-parallel converter circuit 85 converts packets in a serial format received from the first device controller 41 via the serial bus 44 into packets in a parallel format. The buffer 86 temporarily stores the packets in a parallel format converted by the serial-to-parallel converter circuit 85. The packet decoding circuit 87 decodes the packets in a parallel format temporarily stored in the buffer 86, and extracts data contained in the packets.

The packet generation circuit 88 generates packets to be transmitted to the first device controller 41. The buffer 89 temporarily stores the packets generated by the packet generation circuit 88. The parallel-to-serial converter circuit 90 converts the packets in a parallel format temporarily stored in the buffer 89 into packets in a serial format, and transmits the converted packets to the first device controller 41 via the serial bus 44.

Data that is stored in the interruption information storing buffers 83*a* to 83*d* and that indicates an occurrence of an interruption is converted by the parallel-to-serial converter circuit 90 into packets in a serial format, and the packets are transmitted to the first device controller 41.

Note that the data transmission/reception unit 47, the data transmission/reception unit 60, the data transmission/reception unit 80, the external device controller 62, and the external device controller 82 are each constituted by hardware, such as an application specific integrated circuit (ASIC) or a field programmable gate array (FPGA).

Operation of Control Device

The control device 4 according to this exemplary embodiment controls data that indicates an interruption from the image forming unit 2 or the image reading device 3 of the image forming apparatus 1 as described below.

As illustrated in FIG. 2, in the second device controller 42, when the external device controller 82 detects data that indicates an interruption having been written to any of the interruption information storing buffers 83*a* to 83*d* by any of the external devices 31 to 34 connected to the second device controller 42, the external device controller 82 transmits, to the interruption controller 81, a signal indicating that the data indicating an interruption has been written. Then, the interruption controller 81 generates an interruption signal and transmits the interruption signal to the interruption controller 61 of the first device controller 41 via the dedicated signal line 45. Note that, as the interruption signal, the signal transmitted by the external device controller 82 to the interruption controller 81 and indicating that the data indicating an interruption has been written to any of the interruption information storing buffers 83*a* to 83*d* may be used.

When the interruption controller 61 of the first device controller 41 receives the interruption signal, the interruption controller 61 transmits packets corresponding to the interruption signal to the master controller 40 via the data transmission/reception unit 60.

At this time, in the data transmission/reception unit 60, packet signals corresponding to the interruption signal are generated by the packet generation circuit 75, the packet signals are temporarily stored in the buffer 76, the packet signals are converted into a serial signal by the parallel-to-serial converter circuit 77, and packets corresponding to the interruption signal are transmitted to the master controller 40 via the serial bus 43, as illustrated in FIG. 4.

In this case, as soon as the interruption controller 61 of the first device controller 41 receives packets corresponding to the interruption signal from the second device controller 42, the interruption controller 61 transmits, to the second device controller 42 via the data transmission/reception unit 60, packets (read control signal) for reading data that indicates an interruption and that has been written to any of the interruption information storing buffers 83*a* to 83*d*, as illustrated in FIG. 2.

At this time, in the data transmission/reception unit 60, in response to an instruction from the interruption controller 61, packets for reading the data that indicates an interruption and that has been written to any of the interruption information storing buffers 83*a* to 83*d* of the second device controller 42 are generated by the packet generation circuit 69, the packets are temporarily stored in the buffer 70, the packets are converted into a serial signal by the parallel-toserial converter circuit 71, and packets (read control signal) for reading the data is transmitted to the second device controller 42 via the serial bus 44, as illustrated in FIG. 4.

When the data transmission/reception unit 80 of the second device controller 42 receives the packets (read control signal), the data transmission/reception unit 80 decodes the read control signal, reads the data indicating an interruption from a corresponding one of the interruption information storing buffers 83*a* to 83*d*, and transmits the data to the first device controller 41 via the serial bus 44, as illustrated in FIG. 5.

When the data transmission/reception unit 60 of the first device controller 41 receives the data that indicates an interruption and that has been transmitted from the second device controller 42 via the serial bus 44, the data transmission/reception unit 60 stores the data that indicates an interruption and that has been transmitted from the second device controller 42 in the interruption information storing buffer 63*a* for the second device controller, as illustrated in FIG. 2.

On the other hand, when the master controller 40 receives packets indicating an interruption signal from the first device controller 41, as illustrated in FIG. 2, the master controller 40 obtains interruption packets corresponding to the data that indicates an interruption and that is stored in the interruption information storing buffer 63*a* for the second device controller provided to the first device controller 41 by decoding the content of the received packets, and processes and analyzes the content of the interruption packets. The master CPU 46 of the master controller 40 performs control so as to resolve the interruption state of the second device controller 42 via the first device controller 41 on the basis of the analyzed content of the interruption packets.

As described above, in the exemplary embodiment described above, even in a case where an interruption state occurs in any of the external devices 31 to 34 that are connected to the second device controller 42, an interruption signal transmitted from the second device controller 42 via the dedicated signal line 45 is transmitted to the master controller 40, and data that indicates the interruption state and that has been transmitted from the second device controller 42 is stored in the interruption information storing buffer 63*a* for the second device controller that is provided to the first device controller 41 before the master controller 40 attempts to read the data that indicates the interruption and that is stored in the interruption information storing buffer 63*a* provided to the first device controller 41.

Accordingly, even for data from the second device controller 42 which indicates an interruption, an interruption signal is immediately transmitted to the first device controller 41 from the second device controller 42 via the dedicated signal line 45, and is secondly transmitted to the master controller 40 via the first device controller 41. Therefore, the master controller 40 is able to read the data and respond to the interruption with little delay compared to a case of an interruption state that occurs in any of the external devices 21 and 22 that are directly connected to the first device controller 41, which results in improved simultaneous processes (real-time property).

If this exemplary embodiment is not employed, in a case where the first device controller 41 is connected to the master controller 40, and the second device controller 42 is connected (secondly connected) to the first device controller 41, a process described below needs to be performed. An interruption state that has occurred in the second device controller 42 is first communicated from the second device controller 42 to the first device controller 41 by using packets. Then, the first device controller 41 analyzes the content of the packets, generates packets indicating the interruption state occurred in the second device controller 42, and transmits the generated packets to the master controller 40. The master controller 40 analyzes the content of the packets to thereby determine that the interruption state has occurred in the second device controller 42.

In contrast, if this exemplary embodiment is employed, an interruption state that has occurred in the second device controller 42 is communicated to the first device controller 41 via the dedicated signal line 45, and the first device controller 41 is able to immediately detect the occurrence of the interruption state in the second device controller 42 and respond to the interruption. At this time, the interruption controller 61 of the first device controller 41 transmits an interruption signal to the master controller 40, and simultaneously reads data indicating the interruption state from the second device controller 42 and stores the data in the interruption information storing buffer 63*a* for the second device controller provided to the first device controller 41. Accordingly, the first device controller 41 reads the data that indicates the interruption state and that is stored in the interruption information storing buffer 63*a* for the second device controller in response to an instruction from the master controller 40 with substantially no delay compared to a case of reading data that indicates an interruption state and that is stored in any of the interruption information storing buffers 63*b* and 63*c* of the first device controller 41.

In the exemplary embodiment described above, although a case is described where the second device controller 42 is connected to the master controller 40 via the first device controller 41, a third device controller may be further connected via the second device controller 42. In this case, the second device controller 42 may be configured to include a memory that stores interruption information from the subsequent third device controller in a similar manner to the first device controller 41.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising:
a second sub-controller to which one or more second devices are connected, the second sub-controller including:
a second interruption information memory configured to store second interruption information output from the one or more second devices; and
a second interruption controller configured to transmit an interruption signal in response to storing of the second interruption information in the second interruption information memory,
wherein the second interruption controller is configured to read and transmit the second interruption information stored in the second interruption information memory;

a first sub-controller to which one or more first devices are connected, the first sub-controller including:
> a first interruption information memory configured to store first interruption information output from the one or more first devices, and the second interruption information transmitted from the second sub-controller; and
> a first interruption controller configured to transmit the interruption signal received from the second sub-controller,
> > wherein the first interruption controller is configured to read and transmit the first interruption information and the second interruption information stored in the first interruption information memory;

a master controller configured to control the first sub-controller and the second sub-controller;
a full-duplex serial bus that connects the master controller to the first sub-controller;
a full-duplex serial or parallel bus that connects the first sub-controller to the second sub-controller; and
a unidirectional transmission line configured to transmit the interruption signal from the second sub-controller to the first sub-controller.

2. The control device according to claim 1, wherein the second sub-controller is configured to transmit the second interruption information to the first sub-controller via the full-duplex serial or parallel bus.

3. The control device according to claim 1, wherein the first sub-controller is configured to transmit the interruption signal received from the second sub-controller to the master controller via the full-duplex serial bus.

4. The control device according to claim 2, wherein the first sub-controller is configured to transmit the interruption signal received from the second sub-controller to the master controller via the full-duplex serial bus.

5. The control device according to claim 1, wherein the master controller is configured to read the first interruption information or the second interruption information stored in the first interruption information memory in response to reception of the interruption signal from the first sub-controller.

6. The control device according to claim 2, wherein the master controller is configured to read the first interruption information or the second interruption information stored in the first interruption information memory in response to reception of the interruption signal from the first sub-controller.

7. The control device according to claim 3, wherein the master controller is configured to read the first interruption information or the second interruption information stored in the first interruption information memory in response to reception of the interruption signal from the first sub-controller.

8. The control device according to claim 4, wherein the master controller is configured to read the first interruption information or the second interruption information stored in the first interruption information memory in response to reception of the interruption signal from the first sub-controller.

9. An image forming apparatus comprising:
an image forming unit configured to form an image on a recording medium by using image information; and
a control device configured to control the image forming unit,
wherein the control device according to claim 1 is used as the control device configured to control the image forming unit.

10. An image forming apparatus comprising:
an image reading unit configured to read an image of a document;
an image forming unit configured to form an image on a recording medium by using image information obtained by the image reading unit; and
a control device configured to control the image reading unit and the image forming unit,
wherein the control device according to claim 1 is used as the control device configured to control the image reading unit and the image forming unit.

11. The image forming apparatus according to claim 10, wherein the image forming unit is connected to the control device.

12. A control method comprising:
storing, in a second interruption information memory included in a second sub-controller, second interruption information output from one or more second devices that are connected to the second sub-controller;
transmitting, from a second interruption controller included in the second sub-controller, an interruption signal in response to storing of the second interruption information in the second interruption information memory;
reading and transmitting the second interruption information stored in the second interruption information memory from the second interruption controller;
storing, in a first interruption information memory included in a first sub-controller, first interruption information output from one or more first devices that are connected to the first sub-controller, and the second interruption information transmitted from the second sub-controller; and
transmitting, from a first interruption controller included in the first sub-controller, the interruption signal received from the second sub-controller; and
reading and transmitting the first interruption information and the second interruption information stored in the first interruption information memory from the first interruption controller,
wherein the first sub-controller and the second sub-controller are controlled by a master controller,
wherein the master controller and the first sub-controller are connected to each other by a full-duplex serial bus,
wherein the first sub-controller and the second sub-controller are connected to each other by a full-duplex serial or parallel bus, and
wherein the interruption signal is transmitted from the second sub-controller to the first sub-controller by using a unidirectional transmission line.

13. The control device according to claim 1, wherein the first interruption controller is configured to transmit the interruption signal, the first interruption information and the second interruption information to the master controller.

14. The control method according to claim 12, wherein the transmitting, from the first interruption controller, the interruption signal, comprises transmitting, from the first interruption controller, the interruption signal, to the master controller, and
wherein the transmitting the first interruption information and the second interruption information, from the first interruption controller, comprises transmitting the first interruption information and the second interruption information from the first interruption controller, to the master controller.

* * * * *